(12) United States Patent
Ito et al.

(10) Patent No.: US 11,070,425 B2
(45) Date of Patent: Jul. 20, 2021

(54) METHOD AND SYSTEM OF DETECTING DEVICE REARRANGEMENT IN MANUFACTURING FIELD

(71) Applicant: Hitachi, Ltd., Tokyo (JP)

(72) Inventors: Daisuke Ito, Cupertino, CA (US); Nobuyuki Muranaka, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 16/370,351

(22) Filed: Mar. 29, 2019

(65) Prior Publication Data
US 2020/0313964 A1    Oct. 1, 2020

(51) Int. Cl.
| | |
|---|---|
| H04L 12/24 | (2006.01) |
| H04N 7/18 | (2006.01) |
| G06T 7/246 | (2017.01) |
| H04L 29/08 | (2006.01) |
| G05B 19/05 | (2006.01) |
| G06F 16/16 | (2019.01) |

(52) U.S. Cl.
CPC .......... *H04L 41/0816* (2013.01); *G05B 19/05* (2013.01); *G06F 16/162* (2019.01); *G06T 7/248* (2017.01); *H04L 41/12* (2013.01); *H04L 67/12* (2013.01); *H04N 7/183* (2013.01); *G05B 2219/14006* (2013.01); *G06T 2207/20021* (2013.01); *G06T 2207/30232* (2013.01)

(58) Field of Classification Search
USPC .......................................................... 709/221
See application file for complete search history.

(56) References Cited

U.S. PATENT DOCUMENTS

| | | | | |
|---|---|---|---|---|
| 2005/0116821 A1* | 6/2005 | Wilsey | ................. | G06K 7/1097 340/539.13 |
| 2006/0044430 A1* | 3/2006 | Mouli | ................... | H04N 5/335 348/294 |
| 2006/0055530 A1* | 3/2006 | Wang | ....................... | G01S 5/02 340/539.13 |
| 2013/0201337 A1* | 8/2013 | Tapp | ................ | G08B 13/19697 348/150 |
| 2014/0085479 A1* | 3/2014 | Haas | ..................... | G06Q 10/08 348/159 |
| 2018/0139104 A1* | 5/2018 | Seddigh | ............. | H04L 41/0213 |

\* cited by examiner

*Primary Examiner* — Hermon Asres
(74) *Attorney, Agent, or Firm* — Procopio, Cory, Hargreaves & Savitch LLP (57) ABSTRACT

Example implementations described herein involve a device rearrangement detection system and method. Example implementations maintain the structure of devices in manufacturing field stored in an information technology (IT) system to the latest version, even if the IT system is on a network that is isolated from the devices in the manufacturing field.

13 Claims, 11 Drawing Sheets

| Camera ID | Image |
|---|---|
| Plant1_N_1 | (binary data of images taken the normal condition from the Plant1_N_1) |
| Plant1_N_2 | (binary data of images taken the normal condition from the Plant1_N_2) |

Normal condition DB
145

FIG. 3

| Camera ID | Top left | Top right | Bottom left | Bottom right |
|---|---|---|---|---|
| Plant1_N_1 | 37.381618, -121.980802 | 37.381613, -121.980384 | 37.381211, -121.980821 | 37.381204, -121.980398 |
| Plant1_N_2 | 37.381211, -121.980821 | 37.381208, -121.980609 | 37.380804, -121.980840 | 37.380800, -121.980626 |

401 402 403 404 405

Camera location DB

Logical map 148

FIG. 6

| Camera ID | Object ID | Original location | Current location | Timestamp |
|---|---|---|---|---|
| Plant1_N_1 | 89638946-9ae5-4140-8c13-ddb6cbfced45 | 1312,613,1391,672 | 1196,601,1275,660 | Feb 12, 2019 1:43:31 PM |
| Plant1_N_2 | dbf07410-149e-4cf1-bcc1-f2172c04364f | 210,432,135,462 | 411,303,436,333 | Feb 12, 2019 1:43:31 PM |

701, 702, 703, 704, 705

Tracking status 149

| Operation | PLC Name | Object ID |
|---|---|---|
| Delete | PLC #1 | 89638946-9ae5-4140-8c13-ddb6cbfced45 |
| Delete | PLC #2 | dbf07410-149e-4cf1-bcc1-f2172c04364f |
| Add | PLC #1 | dbf07410-149e-4cf1-bcc1-f2172c04364f |
| Add | PLC #2 | 89638946-9ae5-4140-8c13-ddb6cbfced45 |

901 – Operation
902 – PLC Name
903 – Object ID
910, 911, 912, 913

Rearrangement Notification Message
205

METHOD AND SYSTEM OF DETECTING DEVICE REARRANGEMENT IN MANUFACTURING FIELD

BACKGROUND

Field

The present disclosure relates to Internet of Things (IoT) systems, and more specifically, to detecting rearrangements of manufacturing machines on a factory floor deploying IoT solutions.

Related Art

When applying IoT solutions to the manufacturing field, an information technology (IT) server collects the data that represents behavior of manufacturing machines on the field via Programmable Logic Controller (PLC).

However, the IT server will retrieve the data for different manufacturing machines via the same PLC when a KAIZEN event occurs. During a KAIZEN event, the location and order of deployment of manufacturing machines can be changed, which would also cause a change to the connections between PLCs and manufacturing machines. Such events are referred to herein as 'rearrangement'. Further, the IoT system configured to manage the manufacturing field and the IT servers are located on isolated networks that are siloed from each other, so administrators of the IT server cannot obtain the rearrangement data. Thus, there is a need to detect when rearrangements occur from the IT server side.

In a related art implementation, there are systems and methods for discovery and mapping of a network topology which involves network topology discovery, classification on network devices, identification of silent devices, fingerprinting and mapping the network map including PLCs.

SUMMARY

Aspects of the present disclosure can include a method for a system involving a first network coupled to a plurality of programmable logic controllers (PLCs) and one or more assets, and a second network coupled to a server managing a camera monitoring the one or more assets, and an asset manager managing the one or more assets, the method involving, for received images from the camera being indicative of an asset from the one or more assets being moved, monitoring the asset being moved to a final location through the camera; determining a PLC from the plurality of PLCs that is associated with the final location; transmitting information to the asset manager indicative of a change of the asset being moved to the final location and the PLC determined to be associated with the asset being moved based on the final location; reconfiguring the first network according to the change indicated by the information regarding the asset being moved; and processing data from the reconfigured first network.

Aspects of the present disclosure further involve a computer program storing instructions for a system involving a first network coupled to a plurality of programmable logic controllers (PLCs) and one or more assets, and a second network coupled to a server managing a camera monitoring the one or more assets, and an asset manager managing the one or more assets, the instructions involving for received images from the camera being indicative of an asset from the one or more assets being moved, monitoring the asset being moved to a final location through the camera; determining a PLC from the plurality of PLCs that is associated with the final location; transmitting information to the asset manager indicative of a change of the asset being moved to the final location and the PLC determined to be associated with the asset being moved based on the final location; reconfiguring the first network according to the change indicated by the information regarding the asset being moved; and processing data from the reconfigured first network. The computer program may be stored in a non-transitory computer readable medium storing instructions configured to be executed by one or more processors.

Aspects of the present disclosure further involve a system, which can include a first network having a plurality of programmable logic controllers (PLCs) and one or more assets, and a second network having a server managing a camera monitoring the one or more assets, and an asset manager managing the one or more assets. The server can involve a processor, configured to, for received images from the camera being indicative of an asset from the one or more assets being moved, monitor the asset being moved to a final location through the camera; determine a PLC from the plurality of PLCs that is associated with the final location; transmit information to the asset manager indicative of a change of the asset being moved to the final location and the PLC determined to be associated with the asset being moved based on the final location; reconfigure the first network according to the change indicated by the information regarding the asset being moved; and process data from the reconfigured first network.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve a rearrangement detection method and system as follows.

Figure 1:
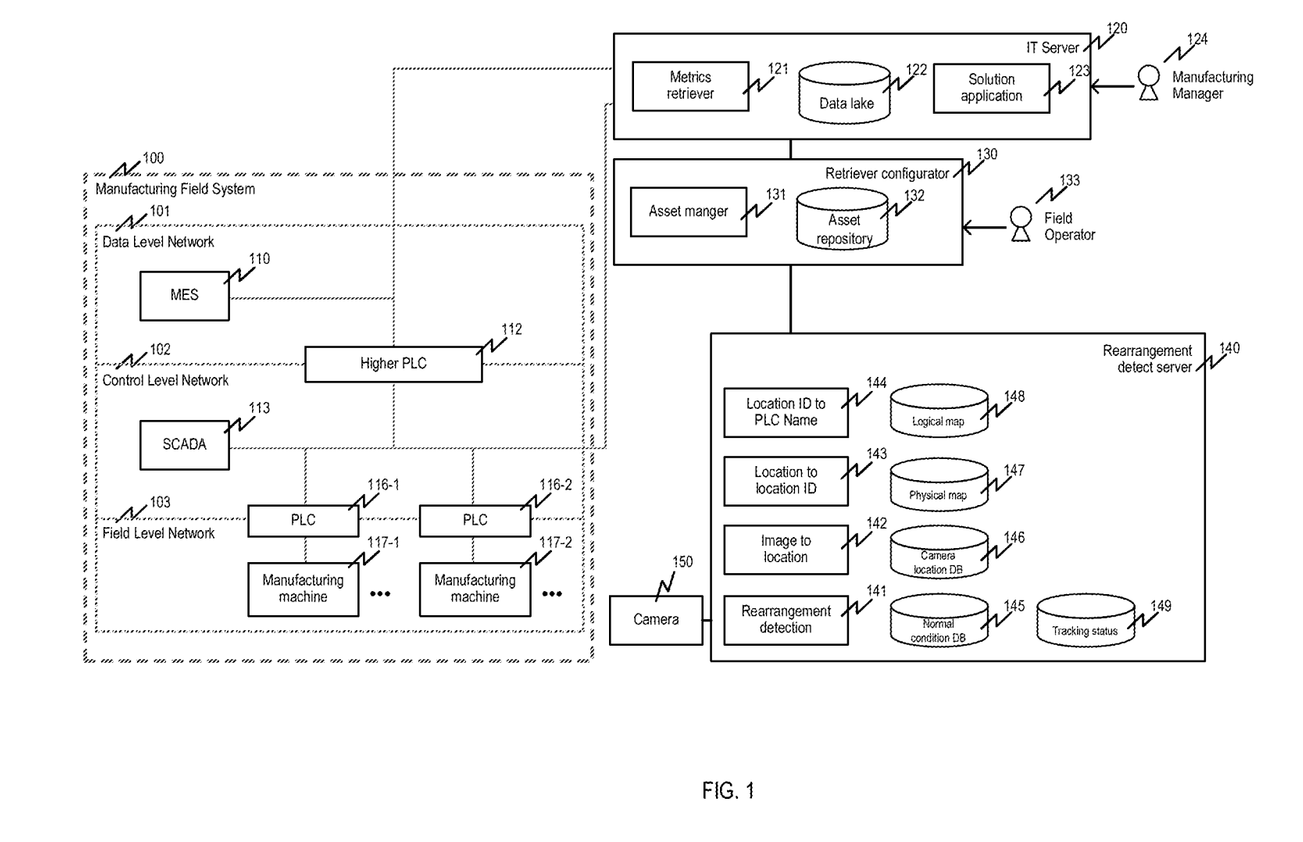
FIG. 1 illustrates a system diagram of an example rearrangement detection system in accordance with an example implementation.

FIG. 1 illustrates a system diagram of an example rearrangement detection system in accordance with an example implementation. The example system includes at least one manufacturing field system 100, one IT Server 120, one retriever configurator 130, one rearrangement detect server 140 and at least one camera 150.

The manufacturing field system 100 involves a data level network 101, a control level network 102, and a field level network 103. The data level network 101 involves a MES 110 (Manufacturing Execution Systems) and at least one higher PLC 112. The control level network 102 involves at least one higher PLC 112, one or more SCADA (Supervisory Control and Data Acquisition) 113, and PLCs 116-1, 116-2. The field level network 103 involves PLCs 116-1, 116-2 and manufacturing machines 117-1, 117-2.

The IT server 120 involves one or more metrics retriever 121, a data lake 122 and one or more solution application 123. The IT server 120 is connected onto the data level network 101 and the control level network 102. The metrics retriever 121 acquires data from MES 110, Higher PLC 112, SCADA 113 and PLCs 116-1, 116-2, annotates metadata onto the acquired data, and stores the annotated data into the data lake 122. For example, if the acquired data is "130, 120" and it is acquired from a PLC designated as PLC-A, the metrics retriever 121 generates annotated data such as "PLC-A, oil temp, 130, coolant temp, 120". The solution application 123 reads the annotated data from the data lake 122, conducts analytics and provides them to the manufacturing manager 124.

The retriever configurator 130 involves an asset manager 131 and an asset repository 132. The asset manager 131 provides a configuration for the metrics retriever 121 based on the asset repository 132. The configuration indicates how to annotate metadata onto the acquired data.

The rearrangement detect server 140 involves a rearrangement detection module 141, an image to location module 142, a location to location identifier (ID) module 143, a location ID to PLC name module 144, a normal condition database (DB) 145, a camera location DB 146, a physical map 147, a logical map 148 and a tracking status storage 149. The rearrangement detect server 140 acquires images from the camera 150 periodically and sends signals to the retriever configurator 130 as needed in accordance with the desired implementation.

In the system as illustrated in FIG. 1, there is a first network involving the manufacturing field system 100 and the IT server 120. The first network involves the PLCs such as higher PLC 112 and PLC 116-1 and 116-2. The IT Server 120 manages data through the first network and stores the data into data lake 122 for processing, and provides the processed results to the retriever configurator 130.

There is also a second network involving the retriever configurator 130 and the rearrangement detect server 140. The field operator 133 manages the retriever configurator 130 based on the results of the IT server 120. However, in such systems, the first network is isolated from the second network, as the manufacturing field system is isolated from the outside world for security reasons and inaccessible other than by a managing server such as IT server 120. Thus, the remote field operator 133 cannot determine when changes are made to the field level network 103 if manufacturing machines 117-1, 117-2 are moved to different locations and managed by different PLCs.

To address the issue, a camera 150 is used to monitor the assets in the manufacturing field system 100 so that when such manufacturing machines move, the images from the camera are processed by the rearrangement detect server 140, which determines the change to the assets and provides such information to the retriever configurator 130 to update the asset repository 132. In this manner, the field operator 133 can thereby be informed of the changes made to the hierarchy and PLC management of the asset repository 132, despite having no direct access to the data level network 101.

Figure 2:
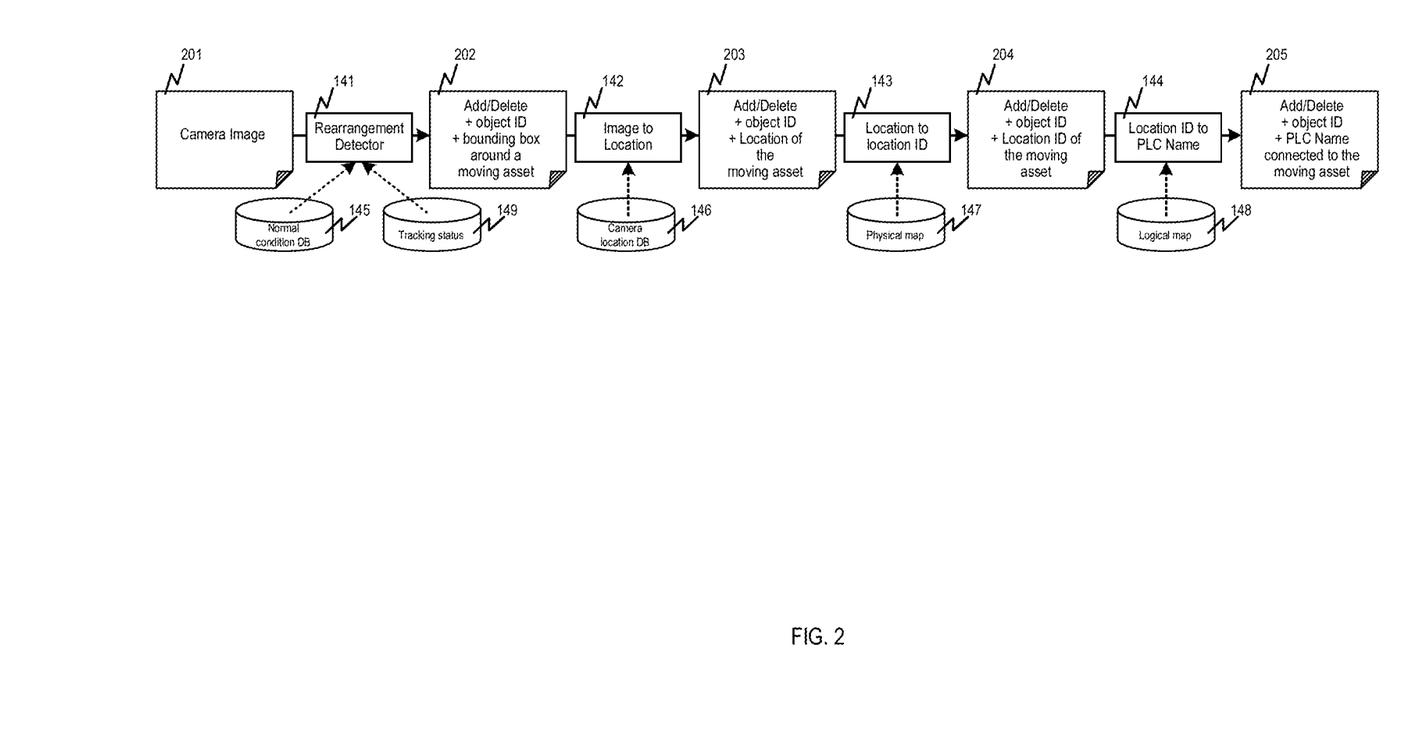
FIG. 2 illustrates a data flow in the rearrangement detect server, in accordance with an example implementation.

FIG. 2 illustrates a data flow in the rearrangement detect server 140, in accordance with an example implementation. In an example implementation, at 201, the rearrangement detection server acquires an image from the camera 150. Then the rearrangement detector module 141 converts the camera image 201 to a message 202 by using the normal condition DB 145 and the tracking status storage 149. The process is utilized to determine if an asset is moving and if so, then an object ID is created for the moving asset and a bounding box is generated around the moving asset in the image.

Then the image to location module 142 converts the message 202 to another message 203 by using the camera location DB 146, which allows for the coordinates within the image to be translated to global positioning satellite (GPS) coordinates so as to designate the actual physical location of the asset being moved. The resulting message 203 indicates the location of the moving asset in terms of GPS coordinates.

Then the location to location ID 143 is used to compare the GPS coordinates to the particular manufacturing area of the manufacturing field system 100. In example implementations, such systems are divided into various manufacturing areas, each managed by one or more PLCs. The physical map 147 defines the area in terms of a range of GPS coordinates encompassing the area. The GPS coordinates of the moving asset is compared to the physical map 147. The resulting message 204 indicates the location ID of the moving asset in terms of the area.

Then the location ID to PLC name 144 refers to the logical map 148 to determine the PLC that manages the associated area. The resulting message 205 involves the PLC associated with the moving asset.

The flow diagram of FIG. 2 is repeated until the asset being moved reaches its final location, whereupon the resulting message 205 will indicate to the asset manager 131 the PLC that is finally connected to the asset being moved. In this manner, an asset being moved can be continuously tracked to its final location and the resulting configuration can be provided to the retriever configurator 130 to update the asset repository 132 with the present configuration of the manufacturing field system 100, despite not having direct access to the data level network 101 or the control level network 102.

Figure 3:
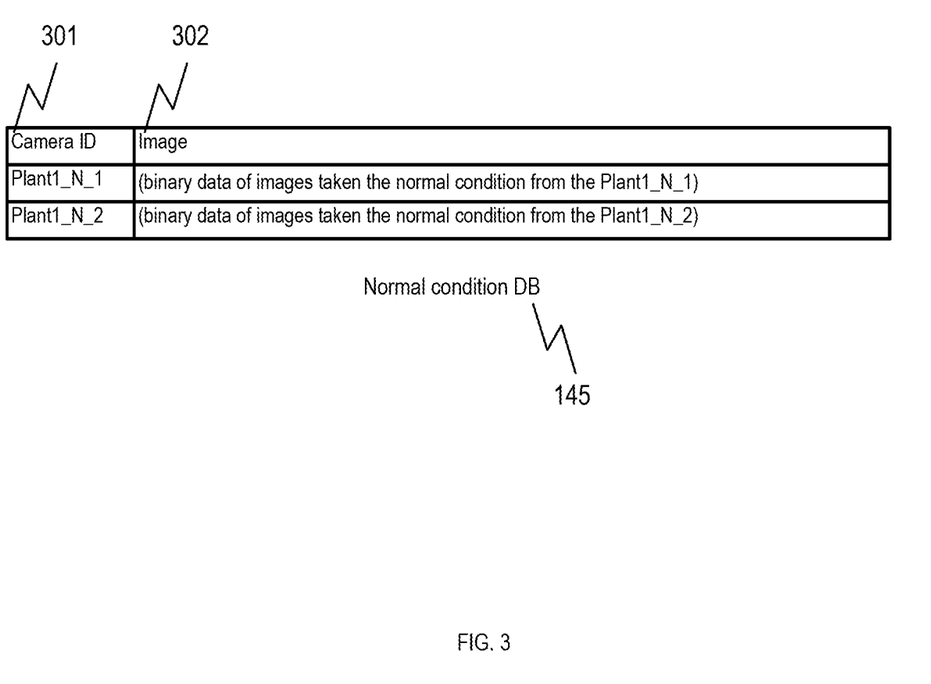
FIG. 3 illustrates an example of the normal condition DB table in accordance with an example implementation.

FIG. 3 illustrates an example of the normal condition DB 145 table in accordance with an example implementation. The camera ID 301 column is a primary key of the table and indicates the ID of the associated camera. The image 302 contains binary data of example images taken from the corresponding camera when the manufacturing field is operating under normal conditions.

Figure 4:
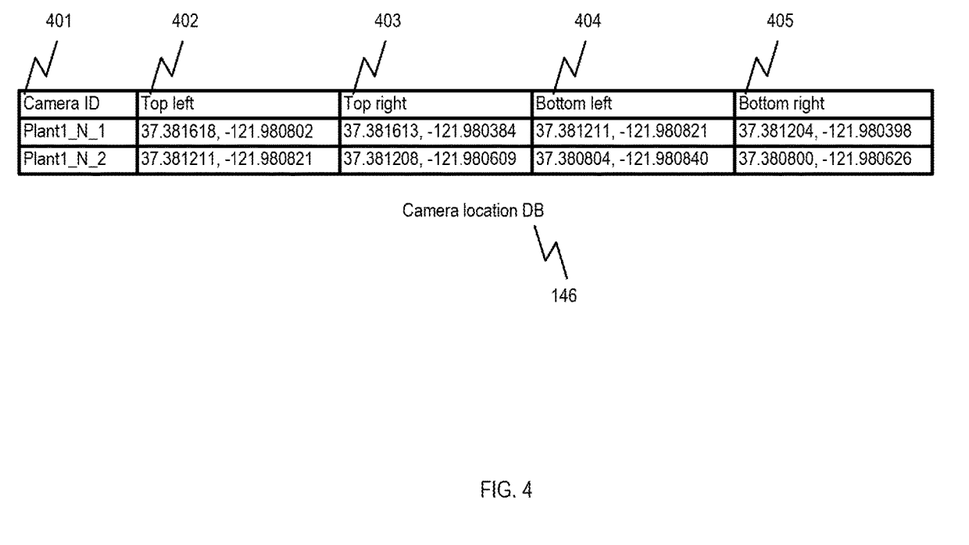
FIG. 4 illustrates an example of the camera location DB table in accordance with an example implementation.

FIG. 4 illustrates an example of the camera location DB 146 table in accordance with an example implementation. The camera ID 401 column is a primary key of the table and indicates the ID of the associated camera. The top left 402, top right 403, bottom left 404, and bottom right 405 columns indicate the location of the corners of the video area in terms of global positioning satellite (GPS) coordinates to provide context as to what location is being captured by the corresponding camera.

Figure 5:
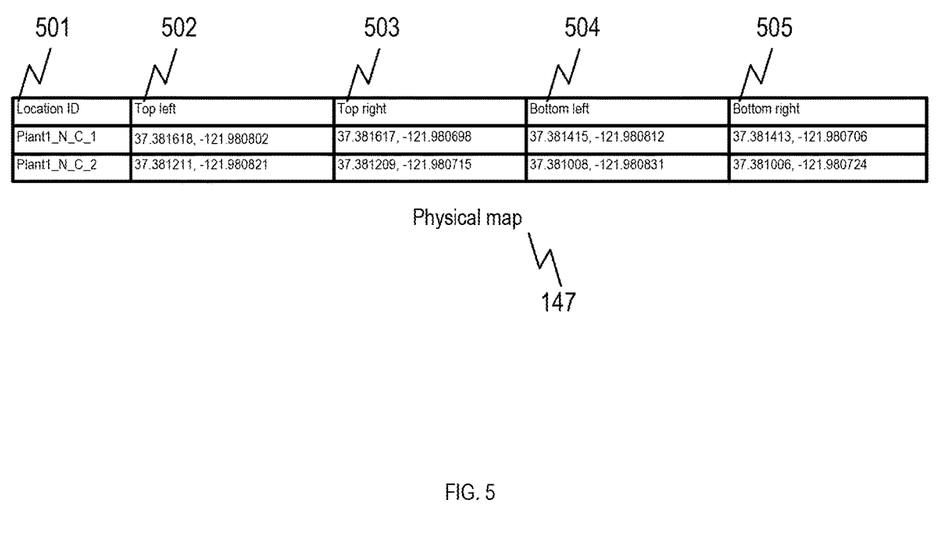
FIG. 5 illustrates an example of the physical map table in accordance with an example implementation.

FIG. 5 illustrates an example of the physical map 147 table in accordance with an example implementation. The location ID 501 column is a primary key of the table and indicates an area of the manufacturing field. The top left 502, top right 503, bottom left 504 and bottom right 505 columns indicate the location of the corners of the area in the manufacturing field designated by the location ID 501 in terms of GPS coordinates.

Figure 6:
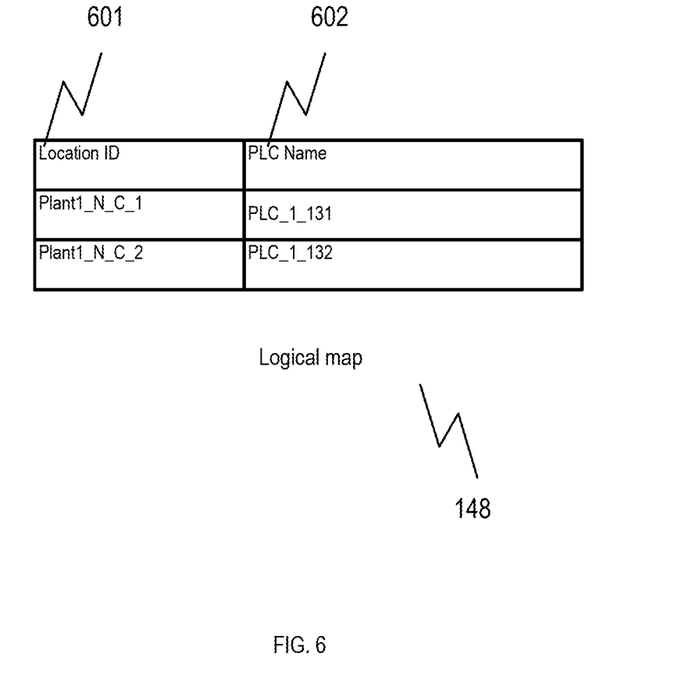
FIG. 6 illustrates an example of the logical map table in accordance with an example implementation.

FIG. 6 illustrates an example of the logical map 148 table in accordance with an example implementation. The location ID 601 column is a primary key of the table and indicates an area of the manufacturing field. The PLC Name 602 indicates the PLC that is managing the manufacturing machines in the area of the manufacturing field corresponding to the location ID.

Figure 7:
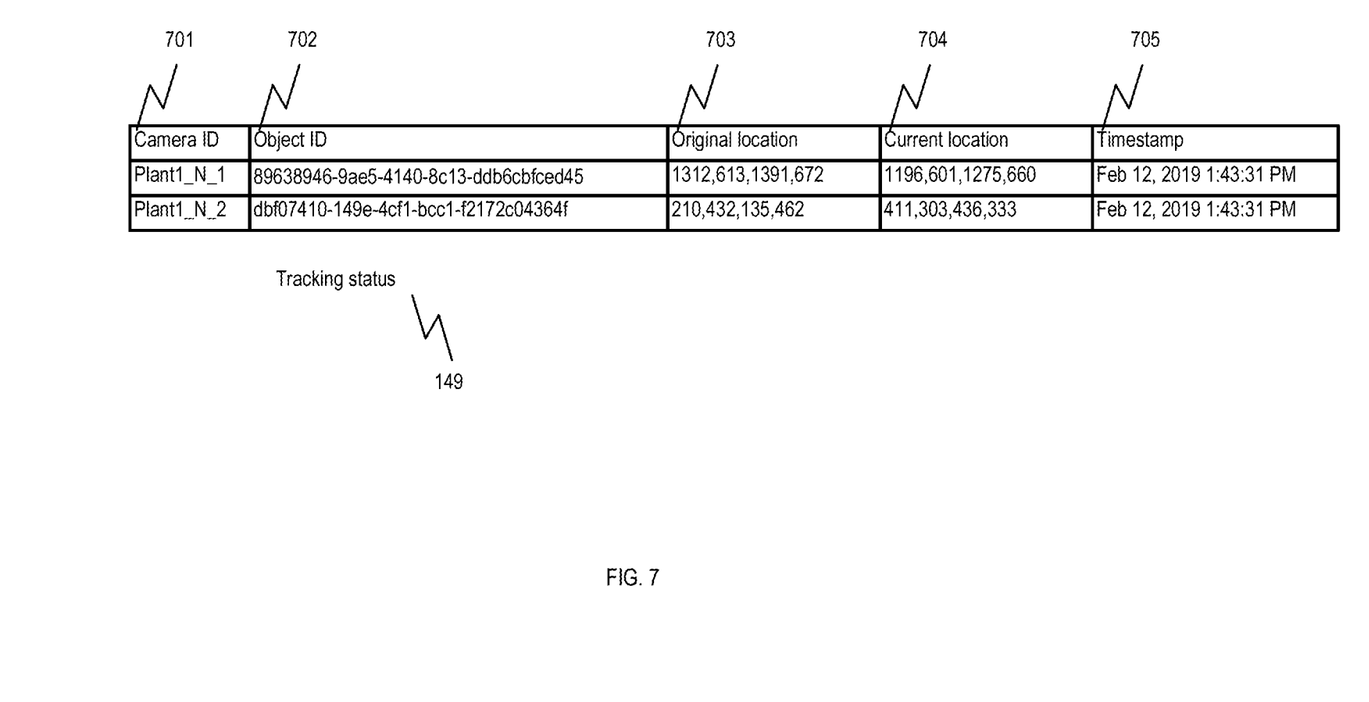
FIG. 7 illustrates an example of the tracking status table in accordance with an example implementation.

FIG. 7 illustrates an example of the tracking status 149 table in accordance with an example implementation. The camera ID 701 column and the original location 703 column are a combined primary key of the table. The object ID 702 indicates an object that is being tracked by the camera indicated by the camera ID 701. The original location 703 indicates a bounding box area within the camera image (e.g., in terms of two apexes representing the top left and bottom right pixel location) indicating the original location of the object corresponding to the object ID. The current location 704 indicates a bounding box area within the camera image (e.g., in terms of two apexes representing the top left and bottom right pixel location) indicating the current location of the object corresponding to the object ID 702. Timestamp 705 indicates the time the tracking status entry was logged. Although the example provided in FIG. 7 represents the coordinates as two apexes that indicate the top left and bottom right of the bounding box, other ways to the represent the bounding box can be used in accordance with the desired implementation and the present disclosure is not particularly limited. For example, the bounding box can be represented as the four corners, the top right and bottom left of the bounding box, and so on.

Figure 8:
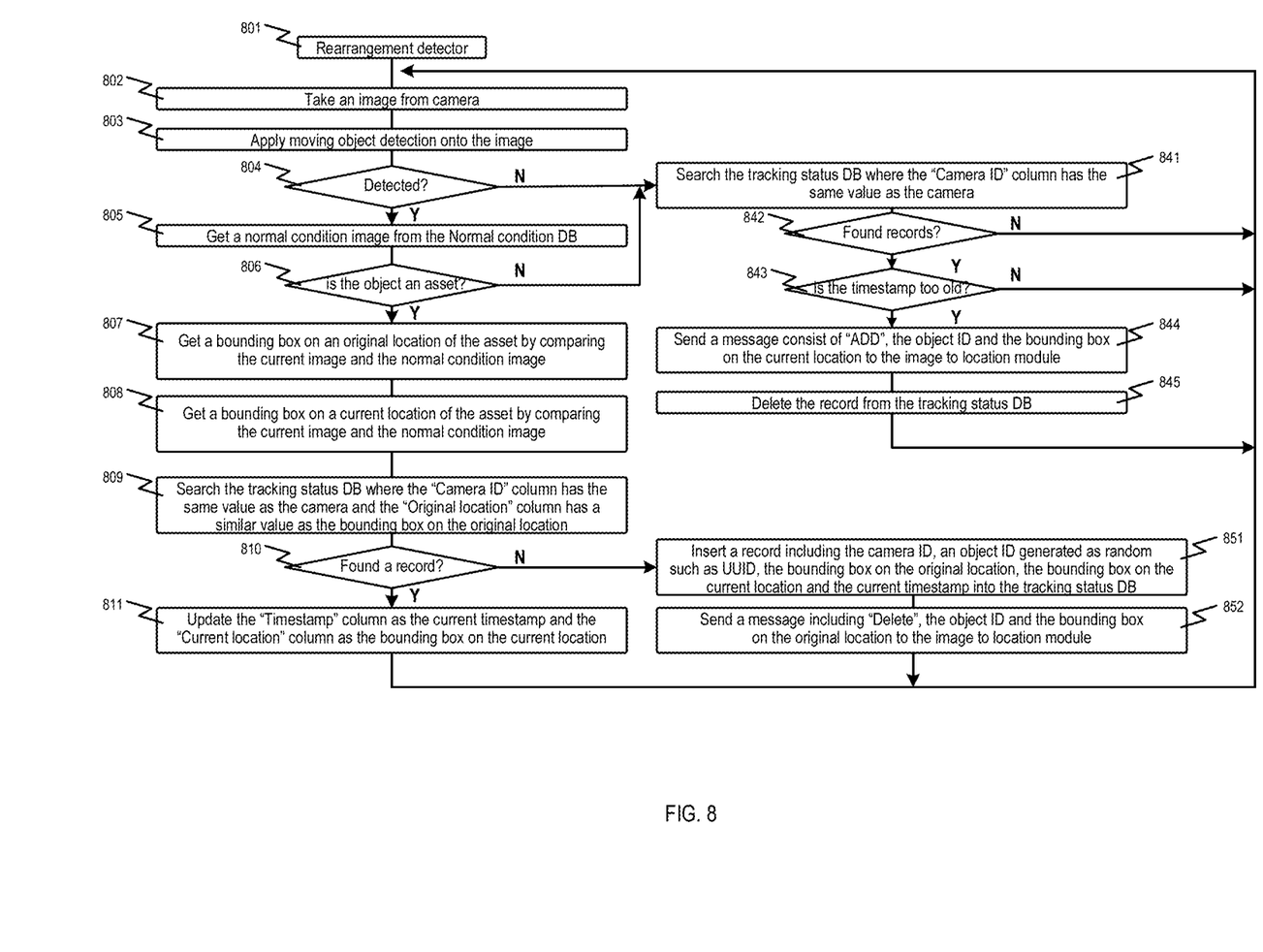
FIG. 8 illustrates a flowchart of an example of the rearrangement detector module in accordance with an example implementation.

FIG. 8 illustrates a flowchart of an example of the rearrangement detector 141 module in accordance with an example implementation. The rearrangement detector 141 module generates the message 202 from the camera message 201. The flow begins at 801 wherein images are taken from the cameras of the manufacturing field at 802. At 803, moving object detection algorithms are applied onto the image to determine if any objects can be moved. The moving object detection algorithm can involve any algorithm in accordance with the desired implementation, including but not limited to taking difference images between images or frames and so on.

At 804, a determination is made as to whether a moving object is detected from the processing at 803. If so (Y) the flow proceeds to 805, otherwise (N) the flow proceeds to 841.

At 805 the normal condition image is obtained from the normal condition DB to determine what object is moving (e.g., an asset that is being relocated, a new object being moved into the camera view such as a human, etc.). At 806, based on the processing at 805, a determination is made as to whether the object is an asset. If so (Y) then the flow proceeds to 807, otherwise (N) the flow proceeds to 841.

At 807, a bounding box is obtained for the original location of the asset by comparing the image obtained from the camera versus the normal condition image from the normal condition DB. Based on the processing conducted at 805, the rearrangement detector determines which asset corresponds to the moving object and then obtains the bounding box corresponding to the asset from processing the normal condition image. At 808 a bounding box is obtained for the current location of the asset by comparing the current image and the normal condition image. Based on the processing conducted at 805 and 803, the asset location can be identified in the image from the processing for detecting a moving object within the image.

At 809, the rearrangement detector searches the tracking status DB to determine if an entry for the moving object has been made before by searching for the camera ID corresponding to the camera that provided the image, and for the bounding on the original location having the same bounding box as a record made previously. At 810, if such a record exists (Y) then the flow proceeds to 811, otherwise (N) the flow proceeds to 851.

At 811, the timestamp of the record in the tracking status DB is updated with the present timestamp and the current location of the record is updated with the bounding box of the current location of the asset. Then the flow proceeds back to 802 to take the next images from the cameras.

If no record is found, then a new record is made in the tracking status DB. At 851, a new record is inserted in the format as illustrated in FIG. 7, which can include the camera ID, an object ID generated as random such as a universally unique ID (UUID), the bounding box on the original location, the bounding box on the current location, and the current timestamp into the tracking status DB. In the example implementation, the bounding box stored at the step 851 is represented by two apexes that are a top left and bottom right but other ways to the represent bounding box are acceptable as described in FIG. 7.

At 852, as a new record was made regarding a moving asset, the asset information is thereby deleted from the record. Thus, a message is sent to indicate a deletion of the asset, along with the object ID and the bounding box on the original location to the image to location module. Then the flow proceeds back to 802 to take the next images from the cameras.

At 841, in which there has been no moving asset detected, the rearrangement detector initiates a process to conduct updates on the record. At first the rearrangement detector searches the tracking status DB for the camera corresponding to the received image. At 842, if such a record is found (Yes) then the flow proceeds to 843, otherwise (N) it proceeds back to 802 to obtain the next image for processing. At 843, a determination is made as to whether the timestamp is too old as determined by a preset policy that indicates how long such records should be kept. If the timestamp is not too old (N) then the flow proceeds back to 802 to process the next image, otherwise (Y) the flow proceeds to 844. At 844, the rearrangement detector updates the image to location module with the current assets by sending a message to add the asset, along with the detected object ID and the bounding box on the current location to the image to location module. At 845, the record that indicated that the asset was moving is deleted from the tracking status DB.

Figure 9:
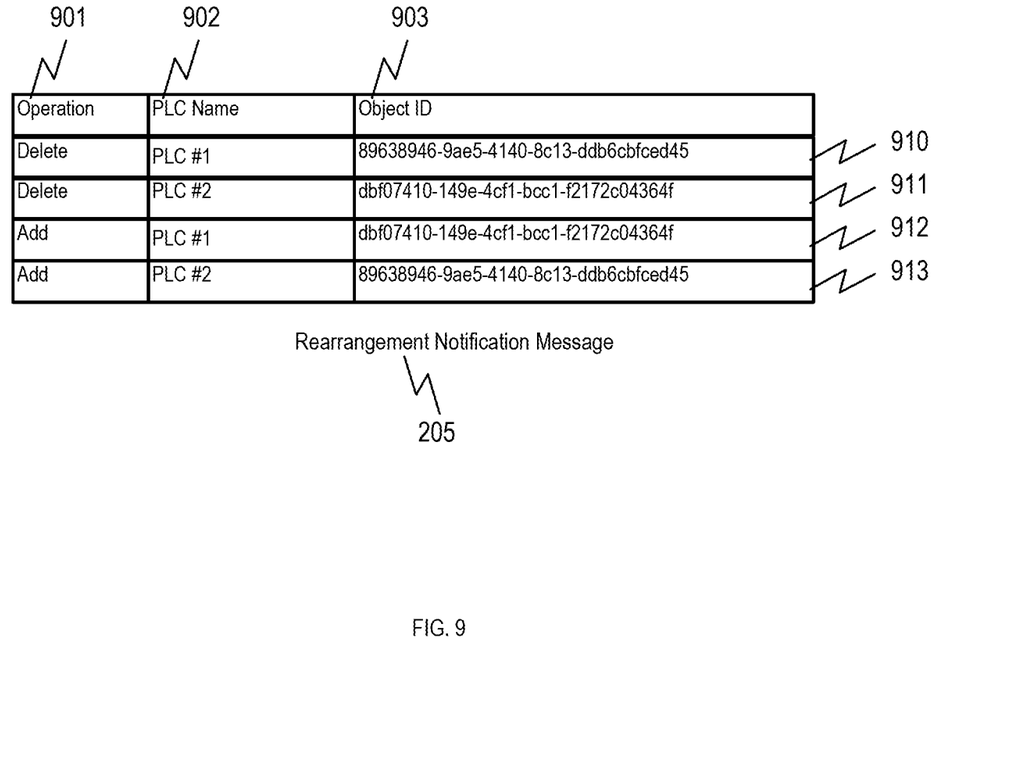
FIG. 9 illustrates an example of the message that is a rearrangement notification message from the rearrangement detect server to the retriever configurator, in accordance with an example implementation.

FIG. 9 illustrates an example of the message 205 that is a rearrangement notification message from the rearrangement detect server 140 to the retriever configurator 130, in accordance with an example implementation. Specifically, the rearrangement notification messages include fields such as the operation to be performed 901, the associated PLC 902 and the object ID 903. In the example, each row 910, 911, 912, and 913 is a message. In the example, assets connected with PLC #1 and PLC #2 are alternated, however the present disclosure is not limited to this and can be modified in accordance with the desired implementation.

Figure 10:
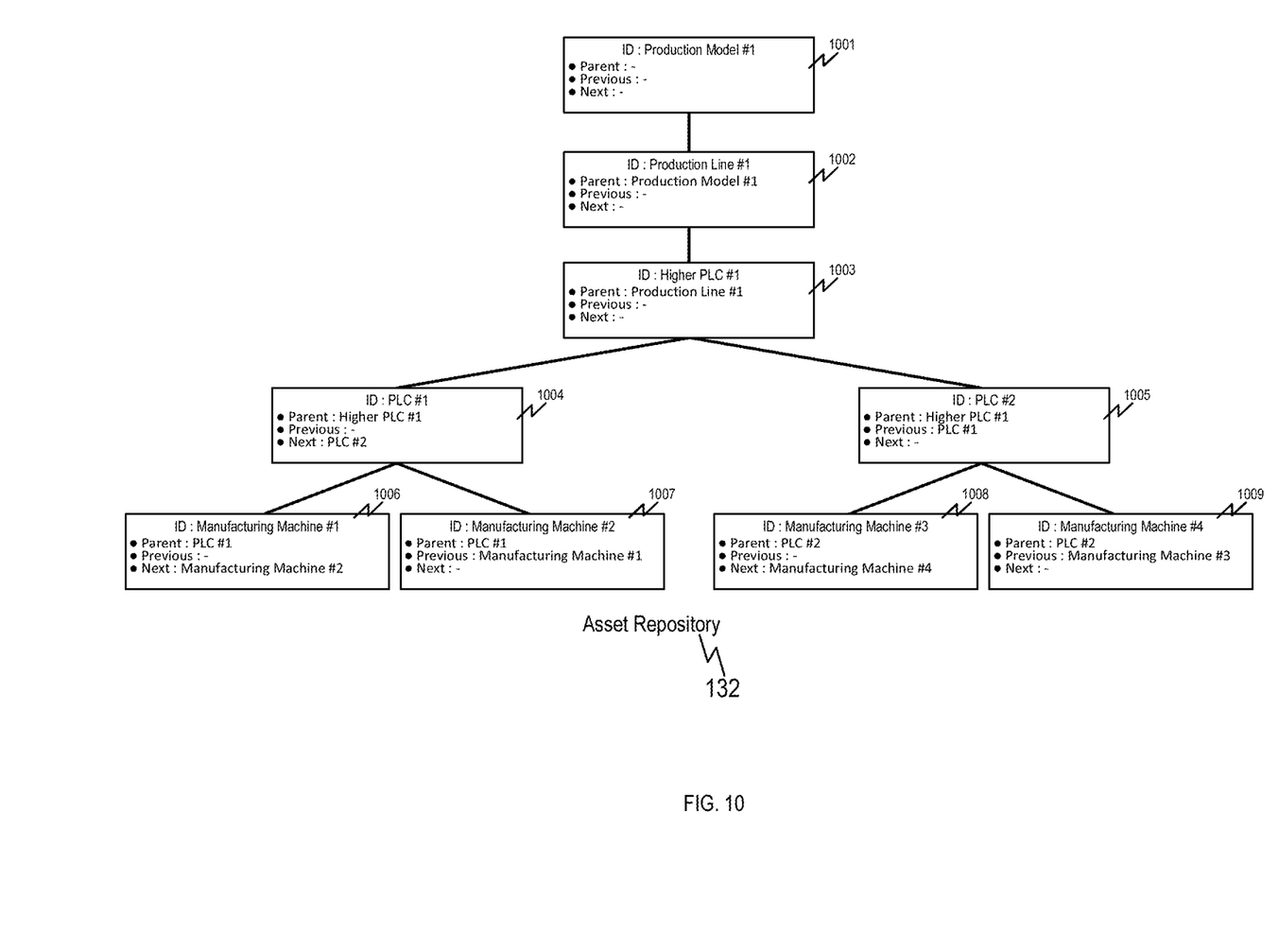
FIG. 10 illustrates an example of data scheme of the asset repository in accordance with an example implementation.

FIG. 10 illustrates an example of data scheme of the asset repository 132 in accordance with an example implementation. An asset repository 132 constructs manages data in a hierarchical structure such as tree structure. As illustrated in asset repository 132, the hierarchy can involve the production model 1001, the associated production lines 102 facilitating the production model, and the higher PLCs 1003 that facilitate the functionality of the production line. Higher PLCs 1003 can manage PLCs 1004, 1005 that are associated with the manufacturing machines themselves 1006, 1007, 1008, 1009. The asset repository is utilized by the field operator 133 to determine the present arrangement of the assets on the manufacturing field system 100, and can be updated by example implementations as assets get moved around.

Figure 11:
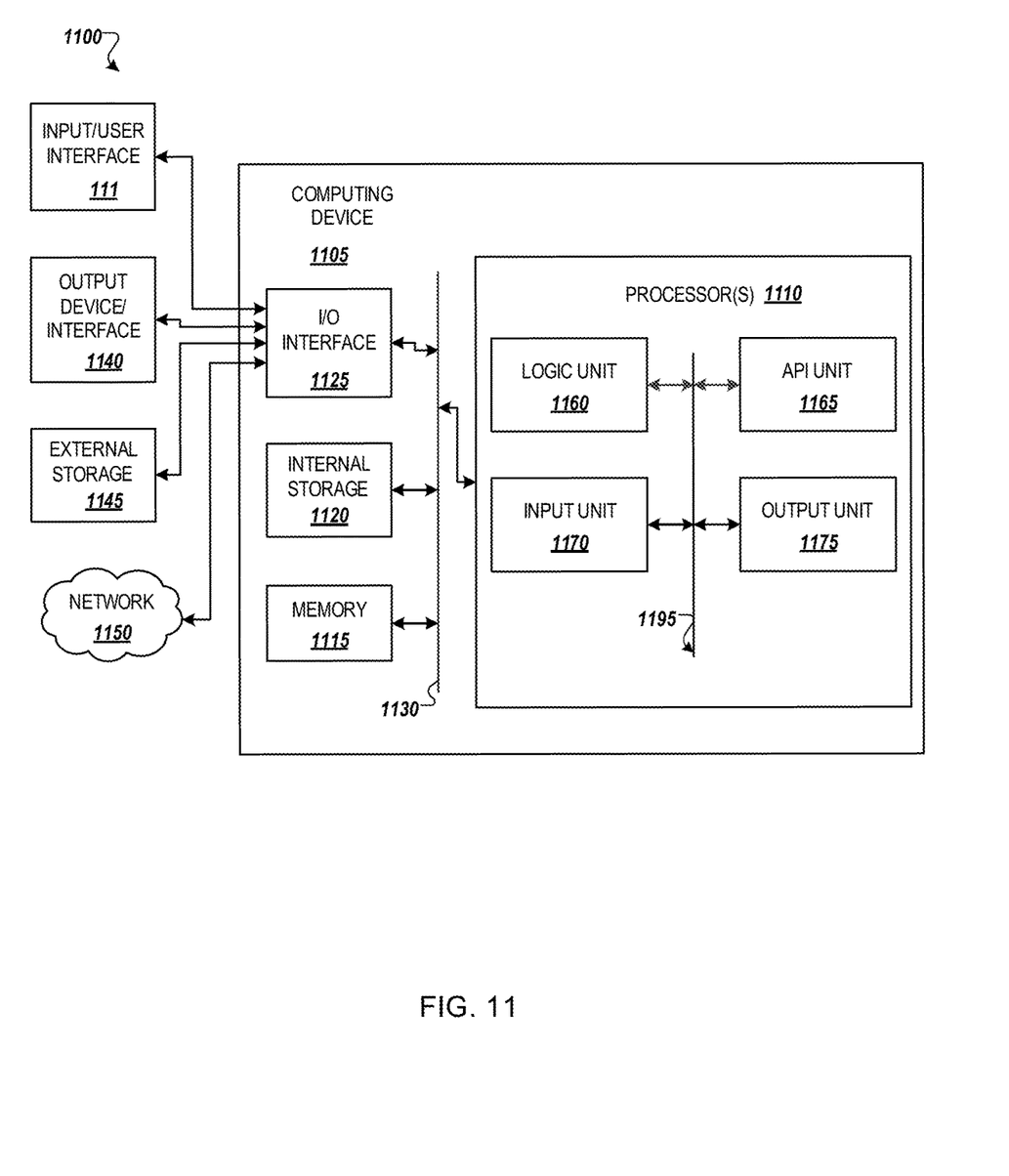
FIG. 11 illustrates an example computing environment with an example computer device suitable for use in example implementations.

FIG. 11 illustrates an example computing environment with an example computer device suitable for use in example implementations. Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105. In example implementations involving a touch screen display, a television display, or any other form of display, the display is configured to provide a user interface.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of physical processors or central processing units (CPU) that is configured to execute instructions loaded from Memory 1115.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

In example implementations involving a server managing a camera monitoring assets as illustrated by the rearrangement detect server 140 of FIG. 1, processor(s) 1110 can be configured to: for received images from the camera being indicative of an asset from the one or more assets being moved, monitor the asset being moved to a final location through the camera as illustrated in FIG. 8; determine a PLC from the plurality of PLCs that is associated with the final location from execution of the flow of FIG. 2; transmit information to the asset manager indicative of a change of the asset being moved to the final location and the PLC determined to be associated with the asset being moved based on the final location as illustrated in FIGS. 8 and 9, reconfigure the first network according to the change indicated by the information regarding the asset being moved through modification of the asset repository of FIG. 10 to be updated; and process data from the reconfigured first network by having the system of FIG. 1 continue operations according to the hierarchy outlined by the asset repository of FIG. 10.

Processor(s) 1110 can be configured to determine if the received images from the camera are indicative of the asset from the one or more assets being moved, by comparing the received images to a normal condition image indicative of a normal state of the one or more assets; and for the comparison indicative of a moving object being the asset from the one or more assets being moved, determining that the received images are indicative of the asset from the one or more assets being moved as illustrated in the flow from 804 to 807 from FIG. 8.

Processor(s) 1110 can be configured to determine the PLC from the plurality of PLCs that is associated with the final location by determining the PLC from the plurality of PLCs that is managing an area associated with the final location through execution of the flow of FIG. 2 to determine what area the final location falls under based on the physical map as illustrated in FIG. 5, and then referring to the logical map as illustrated in FIG. 6 to determine the corresponding PLC. In an example implementation, the processor conducts the determining the PLC from the plurality of PLCs that is managing the area associated with the final location by converting the final location in the received images to global positioning satellite (GPS) coordinates as illustrated in the image to location process 142 of FIG. 2 and FIG. 4, determining the area from a plurality of areas of a manufacturing field associated with the GPS coordinates as illustrated in the location to location ID process 143 of FIG. 2 and FIG. 5; and determining the PLC from the plurality of PLCs that is configured to manage the one or more assets in the area as illustrated in the location ID to PLC Name 144 process of FIG. 2 and FIG. 6.

Processor(s) 1110 can be configured to, for the received images from the camera not being indicative of the asset from the one or more assets being moved, for a record in a tracking status database associated with the camera having a time stamp older than a predetermined threshold, generating a normal condition image indicative of a normal state of the one or more assets from the received images; and deleting the record from the tracking status database as illustrated in the flow of 841-845 of FIG. 8.

Processor(s) 1110 can be configured to, monitor the asset being moved to the final location through the camera by determining a bounding box on an original location of the asset being moved and another bounding box on a current location of the asset being moved based on a comparison of the received images to a normal condition image indicative of a normal state of the one or more assets as illustrated in the flow of 807-809 of FIG. 8.

Processor(s) 1110 can be configured to monitor the asset being moved to a final location through the camera by, for a tracking status database having a record associated with the camera having the bounding box on the original location, updating the record with a current timestamp and with the another bounding box on the current location; and for the tracking status database not having the record associated with the camera having the bounding box on the original location, generating the record for the tracking status database comprising information associated with the camera, the asset being moved, the bounding box on the original location of the asset being moved, and the another bounding box on the current location of the asset being moved; and generating a message to the asset manager to delete the asset being moved from the one or more assets as illustrated in the flow of 811, 851 and 852 of FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a first network coupled to a plurality of programmable logic controllers (PLCs) and one or more assets, and a second network coupled to a server managing a camera monitoring the one or more assets, and an asset manager managing the one or more assets, the method comprising:
    for received images from the camera being indicative of an asset from the one or more assets being moved:
        monitoring the asset being moved to a final location through the camera;
        determining a PLC from the plurality of PLCs that is associated with the final location;
        transmitting information to the asset manager indicative of a change of the asset being moved to the final location and the PLC determined to be associated with the asset being moved based on the final location;
        reconfiguring the first network according to the change indicated by the information regarding the asset being moved; and
        processing data from the reconfigured first network;
        wherein the determining the PLC from the plurality of PLCs that is associated with the final location comprises determining the PLC from the plurality of PLCs that is managing an area associated with the final location.

2. The method of claim 1, further comprising:
    determining if the received images from the camera are indicative of the asset from the one or more assets being moved, the determining comprising:
        comparing the received images to a normal condition image indicative of a normal state of the one or more assets; and
        for the comparison indicative of a moving object being the asset from the one or more assets being moved, determining that the received images are indicative of the asset from the one or more assets being moved.

3. The method of claim 1, wherein the determining the PLC from the plurality of PLCs that is managing the area associated with the final location comprises:
    converting the final location in the received images to global positioning satellite (GPS) coordinates;
    determining the area from a plurality of areas of a manufacturing field associated with the GPS coordinates; and
    determining the PLC from the plurality of PLCs that is configured to manage the one or more assets in the area.

4. The method of claim 1, wherein for the received images from the camera not being indicative of the asset from the one or more assets being moved:
    for a record in a tracking status database associated with the camera having a time stamp older than a predetermined threshold:
        generating a normal condition image indicative of a normal state of the one or more assets from the received images; and
        deleting the record from the tracking status database.

5. The method of claim 1, wherein the monitoring the asset being moved to the final location through the camera comprises determining a bounding box on an original location of the asset being moved and another bounding box on a current location of the asset being moved based on a comparison of the received images to a normal condition image indicative of a normal state of the one or more assets.

6. The method of claim 5, wherein the monitoring the asset being moved to a final location through the camera further comprises:
    for a tracking status database having a record associated with the camera having the bounding box on the original location, updating the record with a current timestamp and with the another bounding box on the current location;
    for the tracking status database not having the record associated with the camera having the bounding box on the original location:
        generating the record for the tracking status database comprising information associated with the camera, the asset being moved, the bounding box on the original location of the asset being moved, and the another bounding box on the current location of the asset being moved; and
        generating a message to the asset manager to delete the asset being moved from the one or more assets.

7. A non-transitory computer readable medium, storing instructions for a system comprising a first network coupled to a plurality of programmable logic controllers (PLCs) and one or more assets, and a second network coupled to a server managing a camera monitoring the one or more assets, and an asset manager managing the one or more assets, the instructions comprising:
    for received images from the camera being indicative of an asset from the one or more assets being moved:
        monitoring the asset being moved to a final location through the camera;
        determining a PLC from the plurality of PLCs that is associated with the final location;

transmitting information to the asset manager indicative of a change of the asset being moved to the final location and the PLC determined to be associated with the asset being moved based on the final location;
reconfiguring the first network according to the change indicated by the information regarding the asset being moved; and
processing data from the reconfigured first network;
wherein the determining the PLC from the plurality of PLCs that is associated with the final location comprises determining the PLC from the plurality of PLCs that is managing an area associated with the final location.

8. The non-transitory computer readable medium of claim 7, the instructions further comprising:
determining if the received images from the camera are indicative of the asset from the one or more assets being moved, the determining comprising:
comparing the received images to a normal condition image indicative of a normal state of the one or more assets; and
for the comparison indicative of a moving object being the asset from the one or more assets being moved, determining that the received images are indicative of the asset from the one or more assets being moved.

9. The non-transitory computer readable medium of claim 7, wherein the determining the PLC from the plurality of PLCs that is managing the area associated with the final location comprises:
converting the final location in the received images to global positioning satellite (GPS) coordinates;
determining the area from a plurality of areas of a manufacturing field associated with the GPS coordinates; and
determining the PLC from the plurality of PLCs that is configured to manage the one or more assets in the area.

10. The non-transitory computer readable medium of claim 7, wherein for the received images from the camera not being indicative of the asset from the one or more assets being moved:
for a record in a tracking status database associated with the camera having a time stamp older than a predetermined threshold:
generating a normal condition image indicative of a normal state of the one or more assets from the received images; and
deleting the record from the tracking status database.

11. The non-transitory computer readable medium of claim 7, wherein the monitoring the asset being moved to the final location through the camera comprises determining a bounding box on an original location of the asset being moved and another bounding box on a current location of the asset being moved based on a comparison of the received images to a normal condition image indicative of a normal state of the one or more assets.

12. The non-transitory computer readable medium of claim 11, wherein the monitoring the asset being moved to a final location through the camera further comprises:
for a tracking status database having a record associated with the camera having the bounding box on the original location, updating the record with a current timestamp and with the another bounding box on the current location;
for the tracking status database not having the record associated with the camera having the bounding box on the original location:
generating the record for the tracking status database comprising information associated with the camera, the asset being moved, the bounding box on the original location of the asset being moved, and the another bounding box on the current location of the asset being moved; and
generating a message to the asset manager to delete the asset being moved from the one or more assets.

13. A system, comprising:
a first network comprising a plurality of programmable logic controllers (PLCs) and one or more assets, and
a second network comprising a server managing a camera monitoring the one or more assets, and an asset manager managing the one or more assets,
the server comprising:
a processor, configured to:
for received images from the camera being indicative of an asset from the one or more assets being moved:
monitor the asset being moved to a final location through the camera;
determine a PLC from the plurality of PLCs that is associated with the final location;
transmit information to the asset manager indicative of a change of the asset being moved to the final location and the PLC determined to be associated with the asset being moved based on the final location;
reconfigure the first network according to the change indicated by the information regarding the asset being moved; and
process data from the reconfigured first network;
wherein the determining the PLC from the plurality of PLCs that is associated with the final location comprises determining the PLC from the plurality of PLCs that is managing an area associated with the final location.

* * * * *